US012748963B1

(12) United States Patent
Madanayake et al.

(10) Patent No.: US 12,748,963 B1
(45) Date of Patent: Sep. 29, 2026

(54) SYSTEMS AND METHODS FOR IMPLEMENTING NEUROMORPHIC COMPUTING

(71) Applicants: Habarakada Liyanachchi Prabath Arjuna Madanayake, Miami, FL (US); Jaime Luis Gadea, Miami, FL (US)

(72) Inventors: Habarakada Liyanachchi Prabath Arjuna Madanayake, Miami, FL (US); Jaime Luis Gadea, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/554,364

(22) Filed: Mar. 2, 2026

(51) Int. Cl.
*G06N 3/065* (2023.01)

(52) U.S. Cl.
CPC .................................... *G06N 3/065* (2023.01)

(58) Field of Classification Search
None
See application file for complete search history.

(56) References Cited

U.S. PATENT DOCUMENTS

| | | | | |
|---|---|---|---|---|
| 9,842,646 | B2 * | 12/2017 | Hu | G11C 27/005 |
| 11,797,833 | B2 * | 10/2023 | Burr | G06N 3/065 |
| 12,423,564 | B2 * | 9/2025 | Liu | G06N 3/065 |
| 2024/0428062 | A1 * | 12/2024 | Wang | G06N 3/048 |

* cited by examiner

*Primary Examiner* — Jany Richardson

(74) *Attorney, Agent, or Firm* — SALIWANCHIK, LLOYD & EISENSCHENK

(57) ABSTRACT

Systems and methods for implementing neuromorphic computing using analog Kolmogorov-Arnold Network (KAN) in standard complementary metal-oxide-semiconductor (CMOS) technology are provided. The system architecture can include the analog KANs which can be efficiently implemented in the standard CMOS technology by using multi-input, multi-transistor amplifiers to compute analog dot products. By leveraging fundamental semiconductor properties of CMOS analog circuits, the system enables the realization of hardware-native intelligence, offering a scalable and energy-efficient alternative to conventional computing architectures.

20 Claims, 6 Drawing Sheets

SYSTEMS AND METHODS FOR IMPLEMENTING NEUROMORPHIC COMPUTING

BACKGROUND

Kolmogorov-Arnold Networks (KANs) have recently emerged as a compelling alternative to conventional Multi-Layer Perceptrons (MLPs) for performing machine learning (ML) tasks due to the ability to model complex nonlinear functions using a reduced number of parameters and improved interpretability. Conventional complementary metal-oxide-semiconductor (CMOS) computing implements neural network models through software frameworks such as PyTorch, often relying on analog computing approaches, including spiking neural networks. However, such conventional methods do not fully exploit the inherent nonlinear characteristics of CMOS transistor physics to improve chip area and power efficiency. KANs constitute mathematical models that describe nonlinear transistor networks, each comprising nonlinear voltage-controlled current sources and passive impedances, thereby emulating KAN-based artificial intelligence (AI) systems and ML systems.

BRIEF SUMMARY

Given the increasing demand for low-power, high-density computing systems suitable for edge AI applications, there is a pressing need to implement neuromorphic computing architectures employing analog Kolmogorov-Arnold Networks (KANs) implemented in standard complimentary metal-oxide-semiconductor (CMOS) technology. By directly leveraging transistor-level nonlinearities without digital abstraction or artificial linearization, such implementations offer the potential for orders-of-magnitude improvements in energy efficiency and silicon area utilization, while maintaining full compatibility with existing semiconductor manufacturing processes.

In view of the challenges discussed in the Background, embodiments of the subject invention provide novel and advantageous systems and methods for implementing neuromorphic computing using analog KAN in standard CMOS technology.

In an embodiment, a system for implementing neuromorphic computing using analog KAN in standard CMOS technology can comprise: an analog KAN comprising a plurality of interconnected KAN nodes each configured to approximate at least one nonlinear function, respectively; and a circuit architecture implemented using the standard CMOS technology, the circuit architecture being configured to support operation of the analog KAN. The analog KAN can further comprise: a mathematical model based on Kolmogorov-Arnold representation theorem configured to realize KANs for executing at least one neuromorphic computing operation; and a nonlinear transistor network configured to realize the mathematical model, the nonlinear transistor network comprising nonlinear voltage-controlled current sources and passive impedance elements. The analog KAN can further comprise a continuous-state KAN configured to process internal signals as continuous analog values rather than discrete digital states, thereby eliminating linearization requirements associated with multilayer perceptron architectures. The analog KAN can be configured to perform both training and inference operations utilizing analog-domain signals and analog hardware components and can function as an analog circuit accelerator for neural network computation. The analog-domain signals can comprise continuous-time and continuous-amplitude electrical signals configured to represent and process information without digitization. The analog hardware components can comprise physical circuit elements configured to generate, process, or manipulate the analog-domain signals without requiring analog-to-digital conversion or digital-to-analog conversion. The analog KAN can be configured for efficient implementation in the standard CMOS technology through use of a multi-input, multi-field-effect transistor (FET) small-signal amplifier to compute analog dot products. The multi-input, multi-FET small-signal amplifier can be configured to implement mathematical operations of the KAN, and the multi-input, multi-FET small-signal amplifier can comprise a multi-FET structure with multiple inputs for simultaneous processing of distinct signals, operating under small-signal conditions, performing nonlinear transformations, and enabling efficient analog computation. Each KAN node can be designed for minimal on-chip complexity, thereby reducing chip area and power consumption through low transistor counts relative to conventional neural circuits, and each KAN node can comprise: (i) a first transistor configured to regulate current flow based on an external control voltage applied to a gate terminal of the first transistor; and (ii) two additional transistors configured to modulate or reprogram magnitude of control current by managing current paths within the KAN node, thereby enabling dynamic tuning of the control current. The nonlinear function(s) can be implemented using analog circuit elements configured to exploit nonlinearities arising from intrinsic semiconductor physics of CMOS transistors and metal-oxide-semiconductor (MOS) capacitors, and the nonlinear function(s) can be utilized without requiring user configuration.

In another embodiment, a method for implementing neuromorphic computing using analog KAN in standard CMOS technology can comprise: providing an analog KAN comprising a plurality of interconnected KAN nodes each configured to approximate at least one nonlinear function, respectively; and implementing a circuit architecture using the standard CMOS technology, the circuit architecture configured to support operation of the analog KAN. The analog KAN can further comprise: a mathematical model based on Kolmogorov-Arnold representation theorem configured to realize KANs for executing neuromorphic computing operation; and a nonlinear transistor network configured to realize the mathematical model, the nonlinear transistor network comprising nonlinear voltage-controlled current sources and passive impedance elements. The analog KAN can further comprise a continuous-state KAN configured to process internal signals as continuous analog values rather than discrete digital states, thereby eliminating linearization requirements associated with multilayer perceptron architectures. The analog KAN can be configured to perform both training and inference operations utilizing analog-domain signals and analog hardware components and can function as an analog circuit accelerator for neural network computation. The analog-domain signals can comprise continuous-time and continuous-amplitude electrical signals configured to represent and process information without digitization. The analog hardware components can comprise physical circuit elements configured to generate, process, or manipulate the analog-domain signals without requiring analog-to-digital conversion or digital-to-analog conversion. The analog KAN can be configured for efficient implementation in the standard CMOS technology through use of a multi-input, multi-FET small-signal amplifier to compute analog dot products. The multi-input, multi-FET small-signal amplifier can be configured to implement mathematical operations of the KAN, and the multi-input, multi-FET small-signal amplifier can comprise a multi-FET structure with multiple inputs for simultaneous processing of distinct signals, operating under small-signal conditions, performing nonlinear transformations, and enabling efficient analog computation. Each KAN node can be designed for minimal on-chip complexity, thereby reducing chip area and power consumption through low transistor counts relative to conventional neural circuits, and each KAN node can comprise: (i) a first transistor configured to control current flow based on an external control voltage applied to a gate terminal of the first transistor; and (ii) two additional transistors configured to adjust or reprogram magnitude of the control current by controlling current paths within the KAN node, thereby enabling dynamic tuning of the control current. The nonlinear function(s) can be implemented using analog circuit elements configured to exploit nonlinearities arising from intrinsic semiconductor physics of CMOS transistors and MOS capacitors, and the nonlinear function(s) can be utilized without requiring user configuration.

DETAILED DESCRIPTION

Figure 1:
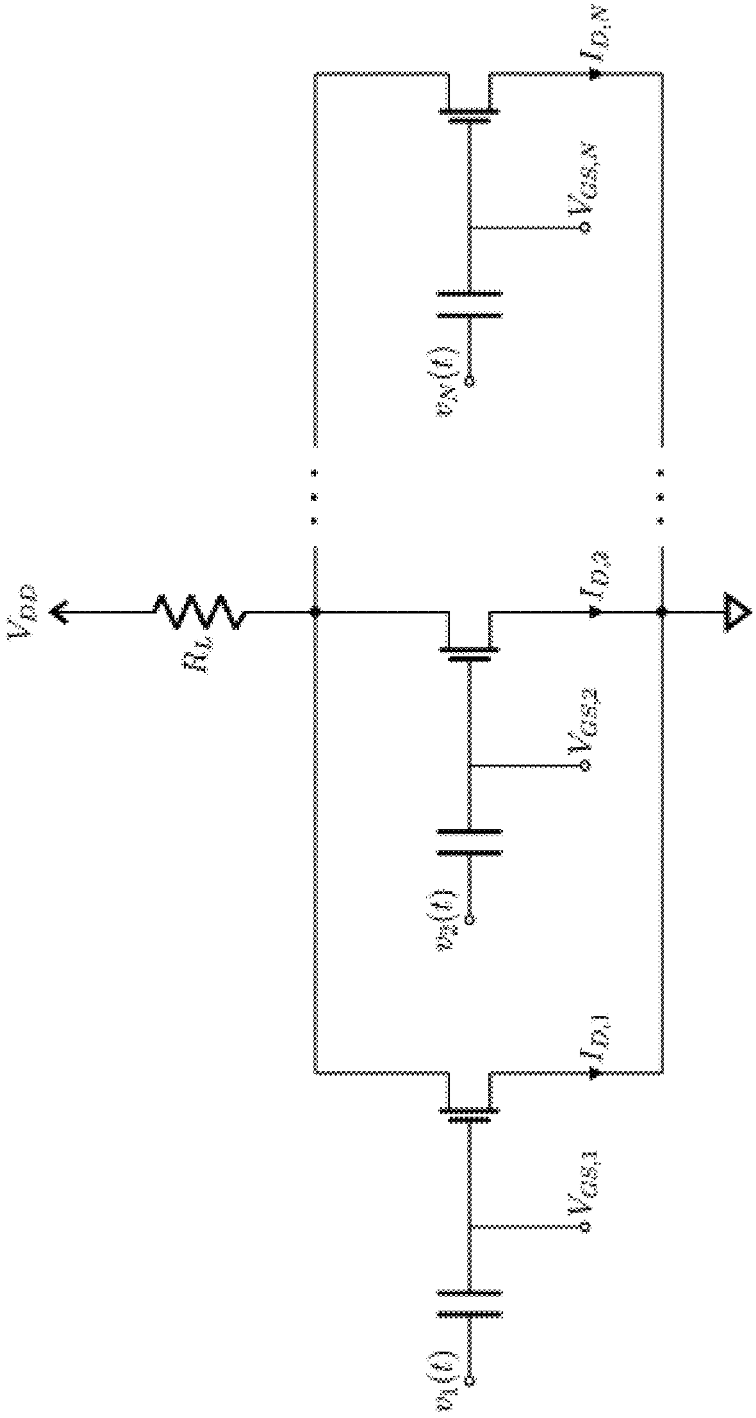
FIG. 1 shows a schematic diagram of a multi-input, multi-field-effect transistor (FET) small-signal amplifier configured to implement mathematical operations underlying a Kolmogorov-Arnold Network (KAN), according to an embodiment of the subject invention.

Embodiments of the subject invention provide novel and advantageous systems and methods for implementing neuromorphic computing using analog Kolmogorov-Arnold Network (KAN) in standard complementary metal-oxide-semiconductor (CMOS) technology. Neuromorphic computing is a computational approach that seeks to emulate the functional principles of biological neural systems through specialized hardware architectures. These architectures aim to achieve efficient, parallel, and low-power processing by mimicking neuronal and synaptic behaviors. An analog KAN represents a specific neuromorphic computing model implemented using analog circuit elements. By leveraging nonlinear voltage-controlled current sources and passive components, the analog KAN directly exploits the intrinsic nonlinearities of transistor devices to realize complex nonlinear functions and neural network operations in continuous-state hardware. Standard CMOS technology provides a fabrication platform for implementing analog KANs, enabling high integration density, energy efficiency, and compatibility with existing semiconductor manufacturing infrastructure. These components form a cohesive system in which neuromorphic computing principles are physically embodied as analog KANs fabricated using standard CMOS technology, offering a pathway toward scalable, energy-efficient neural hardware.

An integrated analog computer is a compact analog computing system in which core computational elements such as adders, integrators, and multipliers are implemented within a single integrated circuit or module to perform real-time operations on continuous signals. Recent advancements have enabled the design and fabrication of the integrated analog computers configured to accelerate the solution of both linear and nonlinear partial differential equation (PDE) systems. Such systems find application in fields including electromagnetics, linear algebra, quantum mechanical modeling, and nonlinear acoustics. For example, a linear electromagnetics accelerator implemented in 180-nanometer (nm) CMOS process demonstrated a performance improvement of approximately 420 times relative to state-of-the-art graphics processing units (GPUs) available as of 2017. In addition, the integrated analog computer achieved an approximate 500-fold reduction in power consumption. Specifically, the analog computer operated at a power level of approximately 200 milliwatts (mW), whereas a conventional NVIDIA GPU required in excess of 100 watts (W) to solve the same problem. More recent developments in analog CMOS computer chips for the solution of PDEs and quantum algorithm emulation include: i) acceleration of numerical models based on the Schrödinger equation and nonlinear acoustic models; and ii) implementation and demonstration of a six-qubit Grover search algorithm and quantum Fourier transform.

Custom CMOS accelerators for artificial intelligence (AI) algorithms typically implement neural network models derived from software frameworks, such as PyTorch or snnTorch, utilizing either clocked digital logic or asynchronous spiking circuits. Such implementations fail to fully exploit the inherent nonlinearities of CMOS transistor physics to enhance chip area efficiency and power consumption. KANs have recently emerged as a promising alternative to Multi-Layer Perceptrons (MLPs) for machine learning (ML) applications. An analog KAN constitutes a mathematical model configured to implement KANs for AI systems or ML systems through nonlinear transistor networks, each comprising nonlinear voltage-controlled current sources and passive impedances. By directly leveraging transistor physics and obviating the requirement to linearize device current-voltage (I-V) characteristics, the developed continuous-state KAN is expected to substantially reduce chip area and power consumption relative to conventional analog computing methods implemented in CMOS technology.

Embodiments are directed to the development and demonstration of analog deep neural network (DNN) training and inference engines based on KAN. Analog DNN training and inference engines based on KANs refer to hardware systems that use analog circuits to implement and operate deep learning models, where the network structure and computation are inspired by or derived from KAN theory. These engines are designed to perform both training and inference directly in analog hardware, using continuous signals rather than digital computation. Analog CMOS core is configured to receive a plurality of continuous-state analog inputs in continuous time and to generate continuous-state, continuous-time outputs in accordance with a simplified KAN model, implemented as an alternative to conventional MLP architectures. Let the inputs be of the form $x_k(t)$ with output given as $$y(t)=\sum_{k-1}^{N}\sum_{l-1}^{M}f_k(g_l(A_{k,1}x_k(t)))\text{ where }f_k(u_k(t))$$

and gl ($A_{k,l}x_k$ (t)) are both nonlinear functions that satisfy the continuity, differentiability, and monotonically increasing characteristics prescribed by the KAN framework. The nonlinear functions are not user-defined, but instead inherently emerge from the semiconductor physics of CMOS transistors and MOS capacitors. The associated ML problem reduces to data-driven determination of real-valued coefficients $A_{k,l}\in R$, which may be computed via backpropagation using standard software frameworks such as PyTorch. A key aspect of the disclosed system is that the same analog KAN accelerator is configured to perform both training and inference operations. For evaluation purposes, the functionality of the analog KAN can be approximated using suitable Simulation Program with Integrated Circuit Emphasis (SPICE) models.

Typical analog realizations of multiply-accumulate (MAC) operations in MLP-based DNNs employ either transconductors (Gm) or capacitors. Gm-based implementations are favorable for scaling and enable dense realizations of MAC operations. However, such implementations inherently exhibit nonlinearity associated with Gm cells. Linear metal-metal capacitors, including metal-oxide-metal (MoM) and metal-insulator-metal (MiM) types, facilitate efficient analog MAC realizations at the cost of increased area consumption. MOS capacitor-based MAC circuits, while dense and scalable, are affected by significant nonlinearity. This nonlinearity in MAC operations can be mitigated by incorporating SPICE-based nonlinearity models of both Gm cells and MOS capacitors during training within software frameworks such as PyTorch. The approach enables the implementation of area-efficient, low-power, and scaling-friendly MAC operations in the DNN. Furthermore, MAC operations performed during backpropagation can utilize nonlinear Gm-based or MOS capacitor-based MACs, provided that the nonlinearity characteristics are accounted for within the backpropagation algorithm, analogous to pre-distortion techniques employed in nonlinear power amplifier (PA).

The nonlinearities utilized in the analog KAN arise inherently from the semiconductor physics of the MOS transistors themselves, thereby resulting in extremely low on-chip circuit complexity. Specifically, each KAN node can be implemented using only three transistors: a first transistor configured to control current flow in response to an external control voltage applied to a gate terminal of the first transistor, and two additional transistors configured to enable reprogramming of the control current. The minimal circuit footprint stands in marked contrast to conventional analog CMOS implementations, which may require dozens of transistors per node, as well as to digital CMOS implementations, which may require several hundred transistors per node to realize equivalent digital perceptron functionality.

The KAN-based AI and ML systems are expected to significantly reduce chip area and power consumption compared to existing approaches. This improvement arises from the use of the KAN architecture, which leverages the naturally occurring nonlinearities of MOS transistors rather than suppressing such nonlinearities through conventional linearization techniques. By embracing, rather than compensating for, inherent transistor nonlinearities, the KAN circuits achieve efficient utilization of CMOS chip area. Additionally, the architecture is expected to achieve low power consumption due to at least the following advantageous features: (1) the absence of switching activity; (2) streamlined signal flow graph structures; and (3) minimal circuit-level complexity. With regard to the absence of switching activity, as the system operates in the analog domain without requiring transitions between discrete logic states, thereby minimizing dynamic power dissipation typically associated with charging and discharging capacitive nodes in digital circuits. With regard to streamlined signal flow graph structures, data propagation and transformation are performed through continuous-time and continuous-amplitude signal processing paths, thereby reducing or eliminating the need for complex routing circuitry, control logic, or clocking mechanisms. With regard to minimal circuit-level complexity, a low circuit-complexity design is achieved by employing a minimal number of transistors per KAN node. Each node is capable of performing nonlinear transformations and configurable current control using only a few active devices, resulting in a lower transistor count compared to compute-in-memory arrays, operational amplifier-based analog implementations, or perceptron-based neural network circuits. This reduction in transistor count per computational element directly contributes to lower static and dynamic power consumption, as well as a reduced silicon footprint, thereby enabling scalable and energy-efficient neuromorphic computing systems in standard CMOS technology. These advantages collectively contribute to improved power efficiency relative alternative technologies, such as compute-in-memory systems and operational amplifier-based analog neural network implementations. The reduced complexity is attributable to the minimal transistor count required per computational node.

A brief overview of the operating principles of an n-channel metal-oxide-semiconductor field-effect transistor (MOSFET) is provided herein. Further background information may be found in B. Razavi, *Design of Analog CMOS Integrated Circuits*, McGraw-Hill, 2001, which is incorporated herein by reference.

1) Variation of transconductance with respect to the threshold voltage under direct-current (DC) biasing conditions: The drain current of a long-channel n-type CMOS field-effect transistor (FET) operating in the above-threshold saturation region can be modeled in accordance with a square-law equation $$I_d=\mu_nC_{ox}\frac{W}{L}(V_{GS}-V_{TH})^2(1+\lambda V_{DS}),$$

where $\mu_n$, and $C_{ox}$ are process related constants, W/L is width/length ratio, $V_{GS}$ is gate-source voltage, $V_{DS}$ is drain-source voltage, $V_{TH}$ is threshold voltage, and $\lambda$ is channel length modulation factor. The square-law equation accounts for process-dependent parameters, device geometry, and bias voltages. The transconductance, $g_m$, as a function of $V_{GS}$ can then be approximated by $$g_m(V_{GS})=\mu_nC_{ox}\frac{W}{L}(V_{GS}-V_{TH})(1+\lambda V_{DS}).$$

Under these conditions, the transconductance increases approximately linearly with the gate-to-source voltage when the drain-to-source voltage is held constant. However, in practical short-channel devices, non-ideal effects such as velocity saturation led to deviations from ideal behavior, resulting in a nonlinear dependence of transconductance on the gate-to-source voltage. Although subthreshold operation provides advantages in power efficiency, due to a favorable transconductance-to-current ratio, subthreshold operation yields reduced absolute transconductance and constrained bandwidth. In view of the objective to achieve high-speed operation for accelerated of AI and ML computations, the development considers only above-threshold operation.

2) Small Signal FET Amplifiers: For a given transconductance, $g_m$, a common-source amplifier exhibits an approximate voltage gain that depends on both load resistance and transistor's output resistance given by $A=-g_mR'$ where $R'=R_L \| r_o$, $R_L$ is load resistance, and $r_o$ is output resistance of the transistor, given by $$r_0 = \frac{\partial V_{DS}}{I_D} = \frac{1}{\frac{1}{2}\mu_n C_{ox}(V_{GS} - V_{TH})^{2\lambda}}.$$

The output resistance is influenced by device parameters and bias conditions. Additionally, the bulk terminal of transistor affects the gate potential and the effective overdrive voltage, thereby acting as a secondary control terminal characterized by its own transconductance of $$g_{mb} \approx \mu_n C_{ox} \frac{W}{L}\left(-\frac{\partial V_{TH}}{\partial V_{BS}}\right)$$

where $V_{BS}$ is the bulk-source DC voltage. It can be shown that $$\frac{\partial V_{TH}}{\partial V_{BS}} = -\frac{\gamma}{2}(2\Phi_F + V_{SB})^{\frac{1}{2}}.$$

The threshold voltage varies with the bulk-to-source voltage, introducing a dependence of the amplifier gain on this bulk bias. Consequently, the overall gain is a nonlinear function of the threshold voltage for a fixed bulk-source voltage, and this nonlinear gain characteristic changes as the bulk bias is varied. In the limiting case where the transistor's output resistance is very large, the gain expression simplifies to the product of the transconductance and the load resistance, which is a function only of the gate-to-source voltage.

3) Multi-Input, Multi-FET Small-Signal Amplifiers: A parallel connection of N N-channel MOSFETs (NMOS), each having an individual gate-to-source DC bias voltage $V_{GS,k}$ and identical width-to-length ratio. The drain terminals of all transistors are tied together to drive a common load resistance. Under these conditions and neglecting the output impedance of transistors, the overall input-output behavior approximates a multi-input function that corresponds to a weighted sum of the individual transistor transconductances multiplied by the respective small-signal inputs of $$\sum_{k=1}^{N} g_m(V_{GS,k}) v_{gs,k} R_L$$

where $v_{gs,k}$ is the small-signal input at transistor number $k=1, 2, \ldots, N$. Each transistor receives a unique small-signal input voltage along with a unique DC gate bias, and all transistors are connected in parallel as shown in FIG. 1. The configuration effectively implements a scaled dot product operation between the vector of transistor transconductances serving as programmable weights and the vector of small-signal input voltage representing the input data. Thus, the multi-input, multi-transistor common-source amplifier provides a real-time method for computing an N-point dot product operation. The weighting factors can be dynamically adjusted by selecting appropriate DC bias voltages at the gates of the individual transistors.

4) Frequency-Dependent Analog Dot Products: The presence of junction capacitance and load capacitance introduces significant frequency dependence in the response of the amplifier, resulting in a reduction of gain at frequencies above the dominant pole. While first-order analysis often assumes a single dominant pole for the transistor, practical devices exhibit a higher-order frequency response due to the combined effects of the junction capacitances at the transistor terminals, as well as the source and load impedances. When the load and source are considered purely resistive, the dominant pole may occur either at the input, commonly determined by the Miller effect through the input-equivalent drain-to-gate capacitance multiplied by the voltage gain, or at the output, where the load capacitance governs the response. Consequently, the amplifier's frequency-dependent behavior can be modeled as a weighted sum of the individual transistor transconductances and the respective small-signal inputs, each modulated by a frequency-dependent term that accounts for the dominant pole time constants and the load impedance of the form $$Y(s) = -\sum_{k=1}^{N} g_m(V_{GS,k}) V_{gs,k}(s) \frac{1}{1 + s\tau_k} R_L$$

where $s \in C$ is the Laplace variable. Incorporating a second pole associated with the complex drain impedance and parasitic elements of the load further refines the frequency-dependent model, providing a more accurate representation of the amplifier's response of the form Y(S)

$$Y(s) = -\sum_{k=1}^{N} g_m(V_{GS,k}) V_{gs,k}(s) \frac{1}{1 + s\tau_k} z'(s)$$

where the load impedance $z'(s)=z_o(s) \| Z_L(s)$ is defined as the parallel combination of the complex drain impedance, $z_o(s)$, and the load impedance including parasitics, $Z_L(s)$.

In embodiments, a multi-transistor, multi-input dot-product circuit, in which the transconductance of each FET is individually configurable, conforms to the general mathematical structure defined by a KAN. In the time-domain, a parallel connection of N N-channel FETs operating in the saturation region, each with an individualized gate-to-source bias voltage $V_{GS,k}$, $k=1, 2, \ldots, N$, results in a corresponding set of transconductance values $g_{m,k}(V_{GS,k})$. All N transistors share a common drain-to-source voltage $V_{DS}$, but may exhibit differing bulk-to-source voltages and channel-length modulation factors as a consequence of the respective biasing conditions. Under the assumption of a first-order low-pass response with a dominant pole, and further assuming that the input signals remain within the effective passband, the output voltage in the time domain can be approximated by a linear superposition of the individual transistor contributions weighted by the respective transconductance values as $$y(t) \approx -\sum_{k=1}^{N} g_{m,k}(V_{GS,k}) v_{gs,k}(t), \quad (1)$$

The transconductance $g_{m,k}(V_{GS})$ is, under idealized conditions, linearly proportional to the drain current $I_{d,k}$ and to the gate overdrive voltage $(V_{GS,k}-V_{TH})$. However, in a practical FET, as the gate-to-source voltage $V_{GS,k}$ approaches the supply voltage $V_{DD}$, the initially linear relationship between transconductance and overdrive voltage becomes increasingly nonlinear. To model this behavior, it is assumed that the product of transconductance and small-signal input, $g_{m,k}(V_{GS})V_{gs,t}(t)$, can be expressed as a general nonlinear function $f(V_{GS}, v_{gs}(t))$, which reduces to the familiar linear form under moderate inversion conditions, i.e., when $(V_{GS}-V_{TH})<<V_{DD}$. Under this assumption, the multi-transistor, multi-input gain expression provided in Equation (1) can be modified to reflect the nonlinear transconductance behavior as a function of both bias and signal conditions to $$y(t) \approx -\sum_{k=1}^{N} f_k(V_{GS,k}, V_{gs}(t)). \quad (2)$$

Recognizing that, for each FET, $M_k$, the DC gate bias voltage functions as a parameter that governs or shapes the gain response, Equation (2) can be reformulated accordingly to reflect the dependence in Equation (3) as $$y(t) \approx -\sum_{k=1}^{N} \phi_k(V_{GS,k} + v_{gs,k}(t)) \quad (3)$$

where $\phi k(\ )$ represents a nonlinear characteristic function associated with the k-th FET, which relates the total gate-to-source voltage, comprising both a DC bias component and a superimposed small-signal input, to the corresponding output current component of the k-th transistor. The output current components are summed at a common node and delivered to the load resistance. A programmable DC gate bias voltage, $V_{GS,k}$, establishes the operating point of the nonlinear function for each transistor, while the time-varying input signal modulates the gate voltage in the vicinity of the bias point, resulting a nonlinear response that increases with signal amplitude.

Embodiments of the subject invention provide a focused technical solution to the focused technical problem of how to implement neuromorphic computing using analog KAN in standard CMOS technology. The solution leverages the intrinsic nonlinearity of CMOS analog circuits. A continuous-state KAN is configured to process internal signals as continuous analog values, and each KAN node is designed for minimal on-chip complexity to enable efficient hardware implementation. The technical solution provided by embodiments of the subject invention is specific to computer technology, addresses a technical problem within the field of computer technology, and results in improved computer systems by minimizing chip area and lowering power consumption. Embodiments of the subject invention have the focused, technologically-specific practical application of enabling compact, power-efficient, and intelligent systems, especially in domains where traditional digital AI hardware is impractical. Embodiments mark a step toward biologically inspired, energy-aware, and hardware-native intelligence. Embodiments can be used to control the circuit architecture configured to support operation of the analog KAN.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

Figure 2:
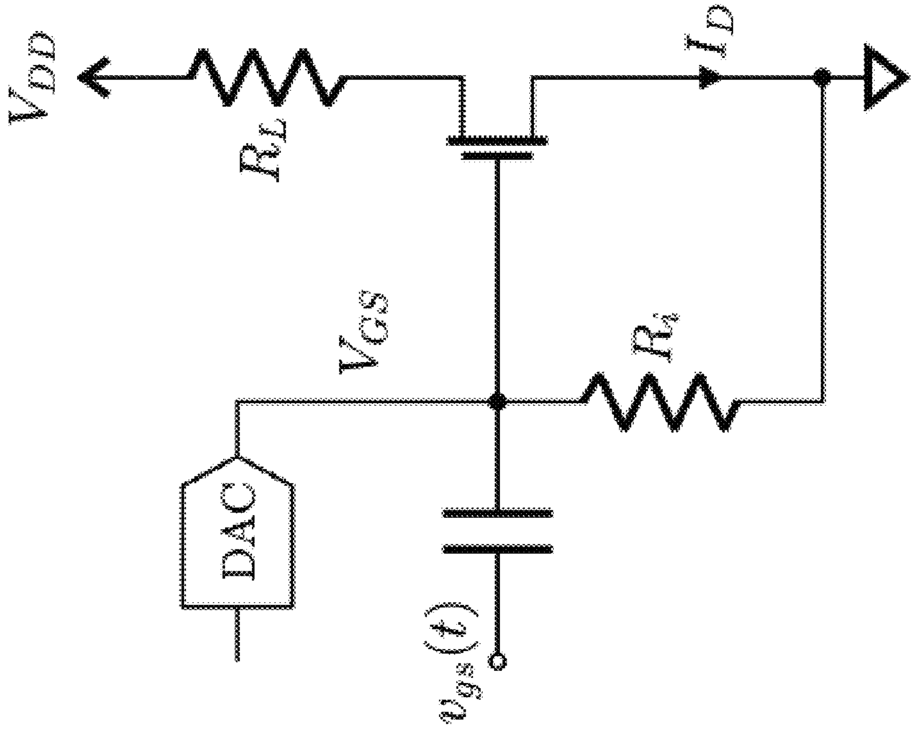
FIG. 2 shows a schematic diagram of a single-input common-source amplifier, illustrating a simple example of the KAN approach.

SPICE simulations were performed for a single-input, single-FET amplifier design shown in FIG. 2, provided as a simple example of the KAN approach. In addition, PyTorch-based training was conducted on an MLP using the Modified National Institute of Standards and Technology (MNIST) handwritten digit recognition dataset, with activation functions customized to reflect the nonlinear transfer characteristics of the amplifier, thereby demonstrating the feasibility of the approach.

Figure 3:
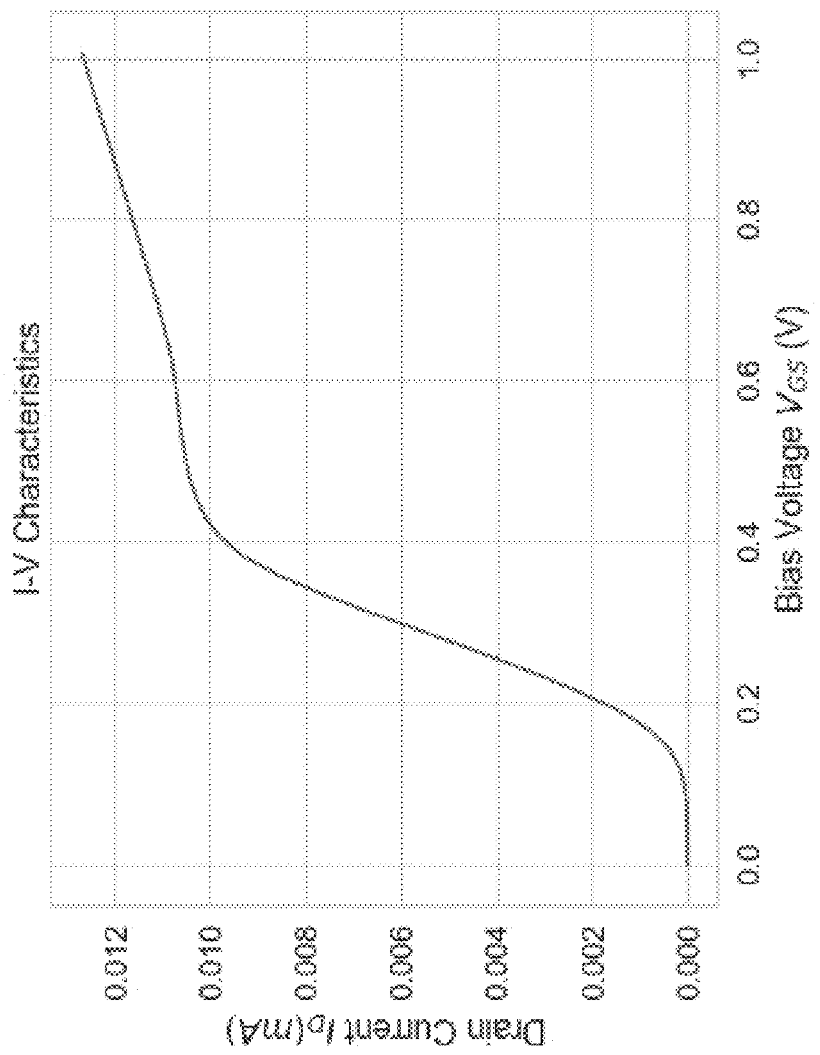
FIG. 3 shows a relationship between gate-source bias voltage and drain current for selected n-channel metal-oxide semiconductor (NMOS) transistor geometry.

The design was implemented using the Taiwan Semiconductor Manufacturing Company (TSMC) 65-nm CMOS process technology. Transistor-level simulations were conducted utilizing the Cadence Virtuoso simulation environment. The simulated current-voltage (I-V) characteristics of the transistor in FIG. 2 are shown in FIG. 3. The plot illustrated the expected behavior: the drain current, $I_D$, began to increase rapidly when the gate-to-source voltage, $V_{GS}$, was approximately equal to the threshold voltage, $V_{TH}$, with the rate of increase diminishing as $V_{GS}$ approached the supply voltage, $V_{DD}$. As all the transistors in the complete KAN design were configured with identical width-to-length ratios, the I-V characteristics were consistent across all amplifiers in the absence of device mismatch.

FIG. 2 shows a conventional common-source amplifier design, modified to include a digital-to-analog converter (DAC) at the gate to provide varying levels of DC bias to the amplifier. This configuration served as a means to control the transconductance $g_m$, which corresponded to a weight in a DNN. The small-signal voltage input, v(gs), represented the input to a neuron in the DNN, while the output current, $I_D$, represented the output of the neuron.

The peak-to-peak voltage gain of the amplifier, $A_{v,p-p}$, constituted an important characteristic for analysis, as it indicated the behavior of transconductance, $g_m$, under varying biasing conditions. The results were shown in FIG. 4 at a relatively high input frequency of 1 GHz, where it was observed that the gain increased linearly between 0.3 V and 0.5 V. Notably, the plot exhibited a sigmoid-like shape, which was significant with respect to the differentiability of the function and thereby influenced the convergence properties of the network during training. Least-squares fitting results to a custom sigmoid function are also shown.

Further evaluation of the convergence behavior of a DNN model employing the developed amplifier required the use of the amplifier's peak-to-peak voltage gain characteristics, $A_{v,p-p}$, as an activation function. To do so, a smooth analytical function approximating the simulated form of $A_{v,p-p}$ was determined. Using a least-squares fitting algorithm available in the SciPy Python Application Programming Interface (API), it was found that a sigmoid function with modified parameters provided a good fit to the simulated data:

$$f(x) = \frac{2.3641379}{1 + e^{-13.81271689x + 5.18283355}} - 0.04965428. \quad (4)$$

Figure 4:
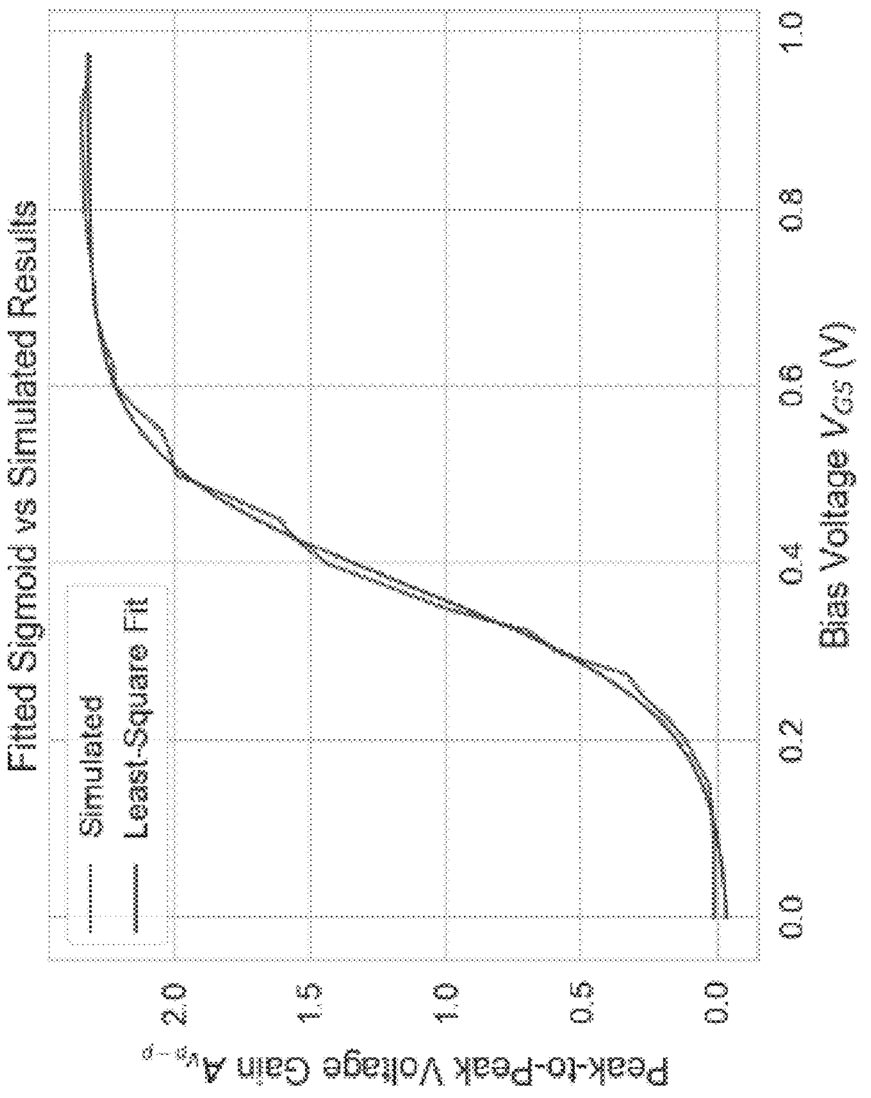
FIG. 4 shows peak-to-peak voltage gain of a common-source amplifier as a function of input gate-source bias voltage. Least-squares fitting results to a custom sigmoid function are also shown.

The resulting fitted sigmoid function was overlaid on the voltage gain plot shown in FIG. 4. As a final verification step for model training, it was confirmed that the fitted function possessed an inverse function, which was given by:

$$g(x) \equiv f^{-1}(x) = -\frac{\ln\left(\frac{2.3641379 - x}{x + 0.04965428}\right) - 5.18283355}{13.81271689}. \quad (5)$$

Figure 5:
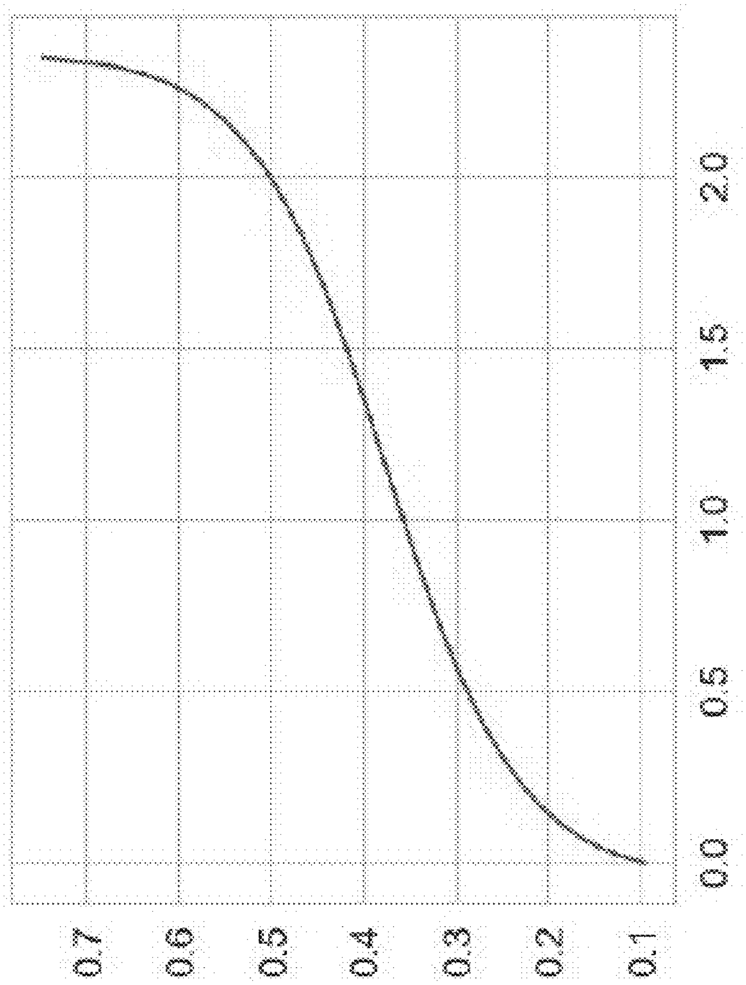
FIG. 5 shows a representation of an inverse function corresponding to a best-fitting sigmoid curve shown in FIG. 4.

The inverse fitting procedure was conducted to determine the voltage domain in which the FETs most accurately replicated both the MAC operation and the activation function as computed in a PyTorch-based model. FIG. 5 presented the inverse of the fitted sigmoid function, denoted as g(x). The results indicated that the inverse function existed within the domain of the fitted sigmoid function when the output range was confined between 0.1 and 0.8. By correlating the valid output range of the inverse sigmoid function with the original voltage gain characteristics, network convergence could be maintained provided that the gate-to-source voltage, $V_{GS}$, remained within the range of 0.1 V and 0.8 V.

An MLP model was constructed for the MNIST dataset using the PyTorch API. The model comprised two hidden layers, with the first hidden layer comprising 32 neurons and the second hidden layer comprising 16 neurons. Both layers employed a custom activation function defined by the equation shown in Equation (4). The model was trained over 20 epochs utilizing the Adam optimization algorithm with a learning rate of 0.0002. Training successfully converged, yielding a test set accuracy of 95.7% and an average cross-entropy loss of 0.157512. For comparative analysis, an identical model architecture was trained using the Rectified Linear Unit (ReLU) activation function in place of the custom activation function. This baseline model achieved a test set accuracy of 95.1% and an average cross-entropy loss of 0.160109. Accordingly, the custom activation function was determined to provide a modest improvement in classification accuracy.

Figure 6:
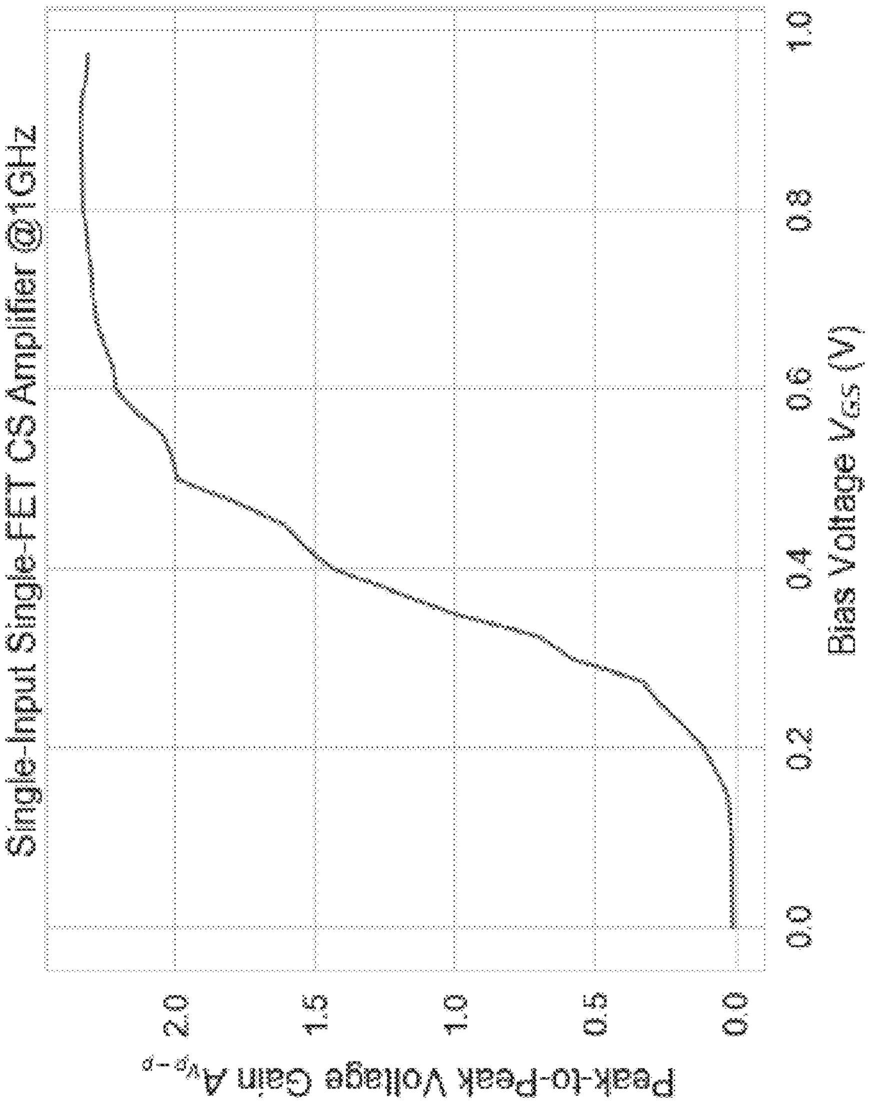
FIG. 6 shows a peak-to-peak voltage gain characteristics of a common-source amplifier.

The peak-to-peak voltage gain of the amplifier represented a critical parameter for evaluation, as it reflected the behavior of transconductance, $g_m$, across different biasing conditions. The results were presented in FIG. 6, where it was noted that the gain rose linearly between 0.3 V and 0.5 V. The plot demonstrated a sigmoid-shaped curve, which was important in terms of the function's differentiability of the function and thus impacted the convergence characteristics of the network during training.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for implementing neuromorphic computing using analog Kolmogorov-Arnold Network (KAN) in standard complementary metal-oxide-semiconductor (CMOS) technology, the system comprising:

an analog KAN comprising a plurality of interconnected KAN nodes, each KAN node being configured to approximate a nonlinear function, respectively; and a circuit architecture implemented using the standard CMOS technology, the circuit architecture being configured to support operation of the analog KAN.

2. The system according to claim 1, the analog KAN further comprising:

a mathematical model based on Kolmogorov-Arnold representation theorem configured to realize KANs for executing a neuromorphic computing operation; and a nonlinear transistor network configured to realize the mathematical model, the nonlinear transistor network comprising nonlinear voltage-controlled current sources and passive impedance elements.

3. The system according to claim 1, the analog KAN further comprising a continuous-state KAN configured to process internal signals as continuous analog values rather than discrete digital states, thereby eliminating linearization requirements associated with multilayer perceptron architectures.

4. The system according to claim 1, the analog KAN being configured to perform both training and inference operations utilizing analog-domain signals and analog hardware components, the analog KAN functioning as an analog circuit accelerator for neural network computation.

5. The system according to claim 4, the analog-domain signals comprising continuous-time and continuous-amplitude electrical signals configured to represent and process information without digitization.

6. The system according to claim 4, the analog hardware components comprising physical circuit elements configured to generate, process, or manipulate the analog-domain signals without requiring analog-to-digital conversion or digital-to-analog conversion.

7. The system according to claim 1, the analog KAN being configured for efficient implementation in the standard CMOS technology through use of a multi-input, multi-field-effect transistor (FET) small-signal amplifier to compute analog dot products.

8. The system according to claim 7, the multi-input, multi-FET small-signal amplifier being configured to implement mathematical operations of the KAN, and the multi-input, multi-FET small-signal amplifier comprising a multi-FET structure with multiple inputs for simultaneous processing of distinct signals, operating under small-signal conditions, performing nonlinear transformations, and enabling efficient analog computation.

9. The system according to claim 1, each KAN node being designed for minimal on-chip complexity, thereby reducing chip area and power consumption through low transistor counts relative to conventional neural circuits, and each KAN node comprising:

(i) a first transistor configured to regulate current flow based on an external control voltage applied to a gate terminal of the first transistor; and (ii) two additional transistors configured to modulate or reprogram magnitude of control current by managing current paths within the KAN node, thereby enabling dynamic tuning of the control current.

10. The system according to claim 1, the nonlinear functions being implemented using analog circuit elements configured to exploit nonlinearities arising from intrinsic semiconductor physics of CMOS transistors and metal-oxide-semiconductor (MOS) capacitors, and the nonlinear functions being utilized without requiring user configuration.

11. A method for implementing neuromorphic computing using analog Kolmogorov-Arnold Network (KAN) in standard complementary metal-oxide-semiconductor (CMOS) technology, the method comprising:

providing an analog KAN comprising a plurality of interconnected KAN nodes, each KAN node being configured to approximate a nonlinear function, respectively; and implementing a circuit architecture using the standard CMOS technology, the circuit architecture being configured to support operation of the analog KAN.

12. The method according to claim 11, the analog KAN further comprising:

a mathematical model based on Kolmogorov-Arnold representation theorem configured to realize KANs for executing a neuromorphic computing operation; and a nonlinear transistor network configured to realize the mathematical model, the nonlinear transistor network comprising nonlinear voltage-controlled current sources and passive impedance elements.

13. The method according to claim 11, the analog KAN further comprising a continuous-state KAN configured to process internal signals as continuous analog values rather than discrete digital states, thereby eliminating linearization requirements associated with multilayer perceptron architectures.

14. The method according to claim 11, the analog KAN being configured to perform both training and inference operations utilizing analog-domain signals and analog hardware components, the analog KAN functioning as an analog circuit accelerator for neural network computation.

15. The method according to claim 14, the analog-domain signals comprising continuous-time and continuous-amplitude electrical signals configured to represent and process information without digitization; and the analog hardware components comprising physical circuit elements configured to generate, process, or manipulate the analog-domain signals without requiring analog-to-digital conversion or digital-to-analog conversion.

16. The method according to claim 11, the analog KAN being configured for efficient implementation in the standard CMOS technology through use of a multi-input, multi-field-effect transistor (FET) small-signal amplifier to compute analog dot products.

17. The method according to claim 16, the multi-input, multi-FET small-signal amplifier being configured to implement mathematical operations of the KAN, and the multi-input, multi-FET small-signal amplifier comprising a multi-FET structure with multiple inputs for simultaneous processing of distinct signals, operating under small-signal conditions, performing nonlinear transformations, and enabling efficient analog computation.

18. The method according to claim 11, each KAN node being designed for minimal on-chip complexity, thereby reducing chip area and power consumption through low transistor counts relative to conventional neural circuits, and each KAN node comprising:

(i) a first transistor configured to regulate current flow based on an external control voltage applied to a gate terminal of the first transistor; and (ii) two additional transistors configured to modulate or reprogram magnitude of control current by managing current paths within the KAN node, thereby enabling dynamic tuning of the control current.

19. The method according to claim 11, the nonlinear functions being implemented using analog circuit elements configured to exploit nonlinearities arising from intrinsic semiconductor physics of CMOS transistors and metal-oxide-semiconductor (MOS) capacitors, and the nonlinear functions being utilized without requiring user configuration.

20. A system for implementing neuromorphic computing using analog Kolmogorov-Arnold Network (KAN) in standard complementary metal-oxide-semiconductor (CMOS) technology, the system comprising:

an analog KAN comprising a plurality of interconnected KAN nodes, each KAN node being configured to approximate a nonlinear function, respectively; and a circuit architecture implemented using the standard CMOS technology, the circuit architecture being configured to support operation of the analog KAN, the analog KAN further comprising:

a mathematical model based on Kolmogorov-Arnold representation theorem configured to realize KANs for executing a neuromorphic computing operation; and a nonlinear transistor network configured to realize the mathematical model, the nonlinear transistor network comprising nonlinear voltage-controlled current sources and passive impedance elements, the analog KAN further comprising a continuous-state KAN configured to process internal signals as continuous analog values rather than discrete digital states, thereby eliminating linearization requirements associated with multilayer perceptron architectures, the analog KAN being configured to perform both training and inference operations utilizing analog-domain signals and analog hardware components, the analog KAN functioning as an analog circuit accelerator for neural network computation, the analog-domain signals comprising continuous-time and continuous-amplitude electrical signals configured to represent and process information without digitization, the analog hardware components comprising physical circuit elements configured to generate, process, or manipulate the analog-domain signals without requiring analog-to-digital conversion or digital-to-analog conversion, the analog KAN being configured for efficient implementation in the standard CMOS technology through use of a multi-input, multi-field-effect transistor (FET) small-signal amplifier to compute analog dot products, the multi-input, multi-FET small-signal amplifier being configured to implement mathematical operations of the KAN, and the multi-input, multi-FET small-signal amplifier comprising a multi-FET structure with multiple inputs for simultaneous processing of distinct signals, operating under small-signal conditions, performing nonlinear transformations, and enabling efficient analog computation, each KAN node being designed for minimal on-chip complexity, thereby reducing chip area and power consumption through low transistor counts relative to conventional neural circuits, and each KAN node comprising:

(i) a first transistor configured to regulate current flow based on an external control voltage applied to a gate terminal of the first transistor; and (ii) two additional transistors configured to modulate or reprogram magnitude of control current by managing current paths within the KAN node, thereby enabling dynamic tuning of the control current, and the nonlinear functions being implemented using analog circuit elements configured to exploit nonlinearities arising from intrinsic semiconductor physics of CMOS transistors and metal-oxide-semiconductor (MOS) capacitors, the nonlinear functions being utilized without requiring user configuration.

* * * * *